United States Patent
Hong (10) Patent No.: US 12,096,519 B2
(45) Date of Patent: Sep. 17, 2024

(54) DATA TRANSMISSION METHOD AND APPARATUS, COMMUNICATION DEVICE, AND STORAGE MEDIUM

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 384 days.

(21) Appl. No.: 17/633,387

(22) PCT Filed: Aug. 9, 2019

(86) PCT No.: PCT/CN2019/100009
§ 371 (c)(1),
(2) Date: Feb. 7, 2022

(87) PCT Pub. No.: WO2021/026690
PCT Pub. Date: Feb. 18, 2021

(65) Prior Publication Data
US 2022/0295264 A1  Sep. 15, 2022

(51) Int. Cl.
*H04W 8/20*  (2009.01)
*H04W 76/20*  (2018.01)
*H04W 88/06*  (2009.01)

(52) U.S. Cl.
CPC .............. *H04W 8/20* (2013.01); *H04W 76/20* (2018.02); *H04W 88/06* (2013.01)

(58) Field of Classification Search
None
See application file for complete search history.

(56) References Cited

U.S. PATENT DOCUMENTS

| 10,708,739 | B2 * | 7/2020 | Nankandiyil | ........... H04W 4/20 |
| 2015/0381332 | A1 | 12/2015 | Rysgaard et al. | |
| 2018/0213392 | A1 | 7/2018 | Ni et al. | |
| 2020/0383152 | A1 * | 12/2020 | Walia | ..................... H04W 76/12 |

FOREIGN PATENT DOCUMENTS

| CN | 104243513 A | 12/2014 |
| CN | 106464394 A | 2/2017 |
| CN | 108347724 A | 7/2018 |
| WO | 2017/076255 A1 | 5/2017 |

* cited by examiner

*Primary Examiner* — Angela Nguyen
(74) *Attorney, Agent, or Firm* — Volpe Koenig (57) ABSTRACT

A data transmission method including: when a terminal includes at least two subscriber identification modules, transmitting the data of a second subscriber identification module in a non-connected state in the at least two subscriber identification modules based on a first subscriber identification module in a connected state in the at least two subscriber identification modules.

18 Claims, 4 Drawing Sheets

Data transmission apparatus 100

Transmission module 110

Fig. 10

DATA TRANSMISSION METHOD AND APPARATUS, COMMUNICATION DEVICE, AND STORAGE MEDIUM

CROSS REFERENCE TO RELATED APPLICATION

The present application is a U.S. National Phase of International Patent Application Serial No. PCT/CN2019/100009 filed on Aug. 9, 2019. The entire contents of the above-cited application are hereby incorporated by reference in their entirety for all purposes.

BACKGROUND

With the development of the wireless communication technology, a multi-SIM terminal device with two or even more subscriber identification module (SIM) cards has an increasing popularity due to its convenience.

Currently, processing methods for multi-SIM mobile phones are based on implementations of various terminal manufacturers, and there is no unified standard, resulting in a variety of different terminal behaviors and processing methods; and when a SIM card in a non-connected state transmits and receives data, it needs to establish a radio resource control connection with a base station to transmit and receive data.

SUMMARY

According to a first aspect of the disclosure, a data transmission method is provided. The method includes: when a terminal includes at least two subscriber identification modules, transmitting data of a second subscriber identification module in a non-connected state in the at least two subscriber identification modules based on a first subscriber identification module in a connected state in the at least two subscriber identification modules.

According to a second aspect of the disclosure, a communication device is provided, including a processor, a transceiver, a memory and an executable program stored on the memory and capable of being executed by the processor, where the executable program, when executed by the processor, executes steps of the data transmission method of the first aspect.

According to a third aspect of the disclosure, a non-transitory storage medium stores an executable program on it, where the executable program, when executed by a processor, implements steps of the data transmission method of the first aspect.

It should be understood that the above general descriptions and later detailed descriptions are examples and illustrative, and cannot limit the examples of the disclosure.

BRIEF DESCRIPTION OF THE DRAWINGS

The accompanying drawings here are incorporated into the specification and constitute a part of the specification, showing the principles consistent with the examples of the disclosure and used together with the specification to explain the examples of the disclosure.

DETAILED DESCRIPTION

Illustrative examples will be described in detail here, and are shown in the accompanying drawings. When the following description refers to the accompanying drawings, unless otherwise indicated, the same numbers in different drawings indicate the same or similar elements. The implementations described in the following illustrative examples do not represent all implementations consistent with the examples of the disclosure. Rather, they are examples of apparatuses and methods consistent with some aspects of the examples of the disclosure as detailed in the appended claims.

The terms used in the examples of the disclosure are for the purpose of describing specific examples, and not intended to limit the examples of the disclosure. The singular forms "one", "said" and "the" used in the examples of the disclosure and the appended claims are also intended to include the multiple forms unless the context clearly indicates other meanings. It should also be understood that the term "and/or" as used herein refers to and includes any or all possible combinations of one or more associated listed items.

It should be understood that although the terms first, second, third, etc. may be used to describe various information in the examples of the disclosure, such information should not be limited to these terms. These terms are used to distinguish the same type of information from each other. For example, without departing from the scope of the examples of the disclosure, first information may also be referred to as second information, and similarly, the second information may also be referred to as the first information. Depending on the context, the word "if" as used herein can be interpreted as "at the time" or "when" or "in response to determining".

Figure 1:
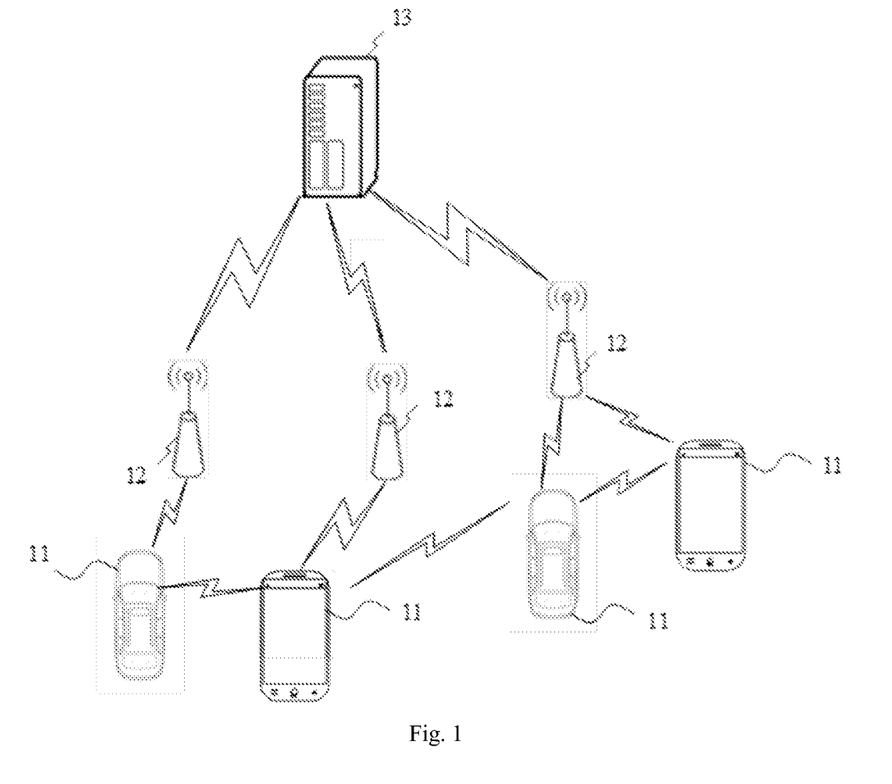
FIG. 1 is a schematic structural diagram of a wireless communication system illustrated according to an illustrative example.

Referring to FIG. 1, it shows a schematic structural diagram of a wireless communication system provided by an example of the disclosure. As shown in FIG. 1, the wireless communication system is a communication system based on a cellular mobile communication technology. The wireless communication system may include: a plurality of terminals 11 and a plurality of base stations 12.

The terminals 11 may refer to devices that provide a user with voice and/or data connectivity. The terminals 11 may communicate with one or more core networks via a radio access network (RAN). The terminals 11 may be internet of things terminals, such as sensor devices, mobile phones (or called "cellular" phones) and computers with internet of things terminals. For example, the terminals may be fixed, portable, pocket-size, handheld, computer built-in or vehicle-mounted apparatuses, for example, stations (STA), subscriber units, subscriber stations, mobile stations, mobiles, remote stations, access points, remote terminals, access terminals, user terminals, user agents, user devices, or user equipment (UEs); or, the terminals 11 may also be unmanned aircraft devices; or, the terminals 11 may also be vehicle-mounted devices, such as a trip computer with a wireless communication function, or a wireless communication device connected with an external trip computer; or, the terminals 11 may also be roadside devices, such as a street lamp, a signal light or other roadside devices with wireless communication functions.

The base stations 12 may be network side devices in the wireless communication system. The wireless communication system may be the 4th generation mobile communication (4G) system, also called a long term evolution (LTE) system; or, the wireless communication system may also be a 5G system, also called a new radio (NR) system or 5G NR system; or, the wireless communication system may also be a next-generation system of the 5G system. An access network in the 5G system may be called a new generation-radio access network (NG-RAN); or, an MTC system.

The base stations 12 may be evolved base stations (eNB) adopted in the 4G system; or, the base stations 12 may also be base stations adopting centralized and distributed architectures (gNB) in the 5G system. Typically, when the base stations 12 adopt the centralized and distributed architectures, they each include a central unit (CU) and at least two distributed units (DU). Protocol stacks of a packet data convergence protocol (PDCP) layer, a radio link control (RLC) layer and a media access control (MAC) layer are disposed in the central unit; and protocol stacks of physical (PHY) layers are disposed in the distributed units, and specific implementations of the base stations 12 are not limited in the example of the disclosure.

The base stations 12 and the terminals 11 may establish wireless connection through wireless radio. In different implementations, the wireless radio is a wireless radio based on the 4G standard; or, the wireless radio is a wireless radio based on the 5G standard, such as new radio; or, the wireless radio may also be a wireless radio based on the next-generation mobile communication standard of 5G.

In some examples, the terminals 11 may also establish end to end (E2E) connection. For example, vehicle to vehicle (V2V) communication, vehicle to infrastructure (V2I) communication and vehicle to pedestrian (V2P) communication in vehicle to everything (V2X) communication and other scenarios.

In some examples, the wireless communication system above may further include a network management device 13.

The plurality of base stations 12 are connected with the network management device 13. The network management device 13 may be a core network device in the wireless communication system, for example, the network management device 13 may be a mobility management entity (MME) in an evolved packet core (EPC). Or, the network management device may also be other core network devices, such as a serving gateway (SGW), a public data network gateway (PGW), a policy and charging rules function (PCRF) or a home subscriber server (HSS). The implementation form of the network management device 13 is not limited in the example of the disclosure.

Execution entities involved in the example of the disclosure include but are not limited to: terminals, base stations and the like supporting multiple subscriber identification modules.

Application scenarios of the example of the disclosure include but are not limited to: all networks consider that each subscriber identification module in terminals with multiple subscriber identification modules is a different terminal, and single subscriber identification modules of the terminals with the multiple subscriber identification modules independently transmit data with the networks. Radio resource control (RRC) connection needs to be established first for data transmission between one subscriber identification module and the networks, however, an RRC connection establishment process will consume time and electrical power.

Figure 2:
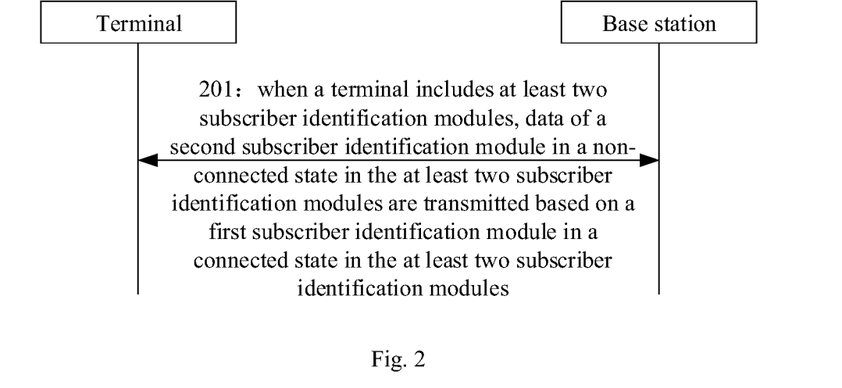
FIG. 2 is a schematic flow diagram of a data transmission method illustrated according to an illustrative example.

As shown in FIG. 2, an illustrative example provides a data transmission method. The data transmission method may be used in a terminal or base station with multiple subscriber identification modules, and includes:

step 201, when a terminal includes at least two subscriber identification modules, data of a second subscriber identification module in a non-connected state in the at least two subscriber identification modules are transmitted based on a first subscriber identification module in a connected state in the at least two subscriber identification modules.

Herein, the at least two subscriber identification modules may be two or more subscriber identification modules. The terminal is a terminal including multiple subscriber identification modules, and behavior patterns of the terminal with the multiple subscriber identification modules may be double cards, double standby and single pass; double cards, double standby and double pass; three cards and three standby, and the like.

The subscriber identification modules may be subscriber identification module (SIM) cards existing in the form of a separate individual, or embedded subscriber identification modules (e-SIM) existing within the terminal in an embedded form, and the like.

The first subscriber identification module and the second subscriber identification module in the multiple subscriber identification modules may belong to the same network operator, or belong to different network operators.

The first subscriber identification module in the connected state may be a subscriber identification module in a radio resource control (RRC) connected state (RRC_CONNECTED), and can monitor data receiving and transmitting states on the network side. The second subscriber identification module in the non-connected state may be in a radio resource control non-connected state.

Herein, the first subscriber identification module and the second subscriber identification module may be two subscriber identification modules belonging to the same terminal. Communication interfaces in the terminal, such as a bus in the terminal, are configured to be used by the first subscriber identification module to transmit data to the second subscriber identification module. The terminal may send the data of the second subscriber identification module through the first subscriber identification module in a mobile communication network, or the first subscriber identification module receives the data of the second subscriber identification module through the mobile communication network.

The first subscriber identification module in the connected state is adopted to transmit the data of the second subscriber identification module in the non-connected state, the second subscriber identification module can achieve data transmission without the need of establishing a connected state, and on the one hand, time consumed by establishing the connected state for the second subscriber identification module can be saved, and the data transmission efficiency is improved. On the other hand, electrical power consumed by establishing the connected state for the second subscriber identification module can be saved, and standby time of the terminal is prolonged.

In one example, the non-connected state includes: an idle state of radio resource control or an inactive state of radio resource control.

The non-connected state may include: an idle state of radio resource control (RRC_IDLE) or an inactive state of radio resource control (RRC_INACTIVE). RRC_CONNECTED is a state used when user equipment (UE) is active and is connected to a specific cell in the communication network. RRC_IDLE is a so-called low-activity state in which the UE sleeps (i.e., inactive), and most of the time is to reduce battery consumption. In the RRC_IDLE state, uplink synchronization is not maintained, and the only uplink transmitting activity that may occur is random access used for conversion from the RRC_IDLE state to the RRC_CONNECTED state. The RRC_INACTIVE state may be considered a combination of RRC_IDLE and RRC_CONNECTED, and mobility in the RRC_INACTIVE state is the same as that in RRC_IDLE, both controlled by the UE. Meanwhile, both the RRC_INACTIVE state and the RRC_CONNECTED state maintain connection of a communication access network and the context of an access (AS) layer.

If the second subscriber identification module in the idle state or inactive state of radio resource control needs to transmit data, random access needs to be initiated first to establish the connected state of radio resource control, and then data transmission may be performed. A connecting process will consume time and electrical power.

The first subscriber identification module in the connected state is adopted to transmit the data of the second subscriber identification module in the non-connected state, so that the second subscriber identification module does not need to establish the connected state of radio resource control, consequently saving time and electrical power of the terminal.

In one example, when the method is applied to the terminal, transmitting the data of the second subscriber identification module in the non-connected state in the at least two subscriber identification modules based on the first subscriber identification module in the connected state in the at least two subscriber identification modules, includes one of: the terminal sends uplink data of the second subscriber identification module to a base station by utilizing the first subscriber identification module; and the terminal receives downlink data of the second subscriber identification module sent by the base station by utilizing the first subscriber identification module.

At a terminal side, if the second subscriber identification module in the idle state or inactive state of radio resource control has uplink data to be sent, the first subscriber identification module in the connected state of radio resource control may perform a request for sending. The first subscriber identification module may send the uplink data of the second subscriber identification module and own uplink data to the base station together. When the first subscriber identification module has no own uplink data, the first subscriber identification module may also only send the uplink data of the second subscriber identification module to the base station.

The base station may send the downlink data for the second subscriber identification module to the first subscriber identification module. The first subscriber identification module is a subscriber identification module in the connected state of radio resource control in the terminal, and the second subscriber identification module is a subscriber identification module in the idle state or inactive state of radio resource control in the terminal. At the terminal side, after receiving the data sent by the base station to the second subscriber identification module, the first subscriber identification module forwards the data to the second subscriber identification module through a data bus and the like in the terminal.

In one example, when the method is applied to the base station, transmitting the data of the second subscriber identification module in the non-connected state in the at least two subscriber identification modules based on the first subscriber identification module in the connected state in the at least two subscriber identification modules, includes one of: the base station sends downlink data of the second subscriber identification module to the first subscriber identification module; and the base station receives uplink data of the second subscriber identification module sent by the first subscriber identification module.

The terminal may inform the base station of the subscriber identification module included in the terminal through signaling and other ways, such that the base station may determine the subscriber identification module belonging to the same terminal.

At a base station side, when the downlink data for the second subscriber identification module in the terminal are sent, if the second subscriber identification module is in the idle state or inactive state of radio resource control, the base station may determine the subscriber identification module in the connected state of radio resource control in the terminal, such as the first subscriber identification module. The downlink data for the second subscriber identification module are sent through the first subscriber identification module. After receiving the data sent by the base station to the second subscriber identification module, the first subscriber identification module forwards the data to the second subscriber identification module through the data bus and the like in the terminal.

The terminal may send the uplink data of the second subscriber identification module to the base station through the first subscriber identification module. The first subscriber identification module is in the connected state of radio resource control, and the second subscriber identification module is in the idle state or inactive state of radio resource control. The first subscriber identification module may send the uplink data of the second subscriber identification module and own uplink data to the base station together. When the first subscriber identification module has no own uplink data, the first subscriber identification module may also only send the uplink data of the second subscriber identification module to the base station. The base station receives the uplink data of the second subscriber identification module uploaded by the first subscriber identification module.

In one example, after the downlink data of the second subscriber identification module sent by the base station is received, the method further includes: the terminal sends reception feedback information of the downlink data to the base station by utilizing the first subscriber identification module.

After the terminal receives the downlink data of the second subscriber identification module through the first subscriber identification module, the terminal may return the reception feedback information of the downlink data of the second subscriber identification module to the base station. Herein, the reception feedback information of the downlink data may be sent by the first subscriber identification module.

The reception feedback information is not returned by the second subscriber identification module, so that the second subscriber identification module does not need to establish the connected state of radio resource control, consequently saving time and electrical power of the terminal.

In one example, after the downlink data of the second subscriber identification module is sent, the method further includes: the base station receives the reception feedback information of the downlink data sent by the first subscriber identification module.

After the terminal receives the downlink data of the second subscriber identification module through the first subscriber identification module, the terminal may return the reception feedback information of the downlink data of the second subscriber identification module to the base station. The base station receives the reception feedback information through the first subscriber identification module.

In one example, transmitting the data of the second subscriber identification module in the non-connected state in the at least two subscriber identification modules based on the first subscriber identification module in the connected state in the at least two subscriber identification modules, includes: the data of the second subscriber identification module and identification information of the second subscriber identification module are transmitted based on the first subscriber identification module.

At the terminal side, when the terminal sends the uplink data of the second subscriber identification module to the base station through the first subscriber identification module, the identification information of the second subscriber identification module may be sent at the same time. The identification information is used to identify a source of the downlink data. The identification information may be an international mobile subscriber identity (IMSI), or a temporary mobile subscriber identity (TMSI) or the like. Such that, after the base station receives the downlink data and the identification information, the base station may determine that the downlink data belong to the second subscriber identification module according to the identification information.

At the base station side, when the downlink data for the second subscriber identification module are sent through the first subscriber identification module, the identification information of the second subscriber identification module may be sent at the same time. The identification information is used to identify a source of the downlink data. The identification information may be an IMSI or a TMSI or the like. Such that, after the terminal receives the downlink data and the identification information, the terminal may determine that the downlink data belong to the second subscriber identification module according to the identification information.

In one example, the method further includes: when there is more than one subscriber identification module in the connected state in the at least two subscriber identification modules, a subscriber identification module with a minimum data cache volume and in the connected state is selected as the first subscriber identification module.

At the terminal side, when the terminal needs to send the uplink data of the second subscriber identification module, if multiple subscriber identification module cards in the terminal are in the connected state, the terminal may select one subscriber identification module for sending the uplink data according to a preset strategy. Herein, the subscriber identification module with the minimum data cache volume may be selected as the first subscriber identification module to send the uplink data of the second subscriber identification module. The subscriber identification module with the small data cache volume is low in data transmission load, such that the influence on own data transmission when the uplink data of the second subscriber identification module are sent may be reduced.

At the base station side, when the base station needs to send the downlink data of the second subscriber identification module, if multiple subscriber identification module cards in the terminal are in the connected state, the base station may select one subscriber identification module for sending the downlink data according to a preset strategy. Herein, the subscriber identification module with the minimum data cache volume may be selected as the first subscriber identification module to receive the downlink data of the second subscriber identification module. The subscriber identification module with the small data cache volume is low in data transmission load, such that the influence on own data transmission when the first subscriber identification module receives the downlink data of the second subscriber identification module may be reduced.

A specific example is provided below in combination with any example above.

In the terminal, when a SIM #1 in the idle state of radio resource control (RRC_IDLE) or the inactive state of radio resource control (RRC_INACTIVE) has uplink data to be sent, whether there is a SIM card in the same multi-SIM terminal in the RRC_CONNECTED state is checked first, and if yes, the SIM card in the RRC_CONNECTED state is requested to send data of the SIM #1 to the base station; and if the SIM card in the RRC_CONNECTED state agrees, the data of the SIM #1 and own uplink data will be sent to the base station together, and a source of the data is identified, for example: the data are identified as SIM #1. If the SIM card in the RRC_CONNECTED state has no own uplink data, a resource is requested from the base station to send the data of the SIM #1, and the source of the data is identified; or, the SIM card #1 directly sends its own data to a SIM #2 without requesting, to be sent by the SIM #2.

If multiple SIM cards are in the CONNECTED state, the SIM #1 selects one SIM card for data sending according to a certain criterion. For example, a SIM card with minimum cache data is selected.

If no SIM card in the same multi-SIM terminal is in the RRC_CONNECTED state, the SIM #1 initiates random access to request an uplink resource to transmit data.

In the base station, when the base station has downlink data to be transmitted to a certain SIM #1 of the multi-SIM terminal, if the SIM card #1 is in the RRC_IDLE or RRC_CONNECTED state, the base station checks whether there is a SIM #2 in the multi-SIM terminal in the RRC_CONNECTED state, and if yes, the base station directly sends the downlink data to the SIM #2 in the RRC_CONNECTED state and informs that the data are sent to the SIM #1, such as, informing the IMSI or TMSI.

If multiple SIM cards are in the CONNECTED state, the base station selects one SIM card according to a certain criterion and sends the data to the SIM card, for example, a SIM card with minimum cache data is selected.

After the SIM #2 in the RRC_CONNECTED state receives the data sent by the base station to the SIM #1, the data are forwarded to the SIM #1 through the interior of the terminal. The SIM card #2 needs to feedback whether the data are correctly received or not to the base station, such as, sending acknowledgement/non-acknowledgement ACK/NACK.

If no SIM card in the same multi-SIM terminal is in the RRC_CONNECTED state, the SIM #1 is paged to send the downlink data to the UE.

Figure 3:
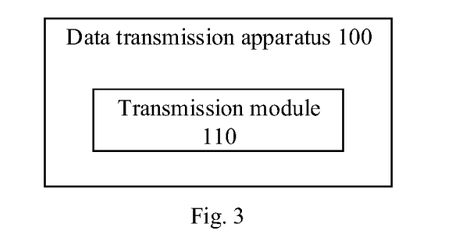
FIG. 3 is a block diagram of a data transmission apparatus illustrated according to an illustrative example.

An example of the disclosure further provides a data transmission apparatus applied to a terminal. FIG. 3 is a schematic structural diagram of composition of the data transmission apparatus 100 provided by the example of the disclosure. As shown in FIG. 3, the apparatus 100 includes: a transmission module 110.

The transmission module 110 is configured to, when the terminal includes at least two subscriber identification modules, transmit data of a second subscriber identification module in a non-connected state in the at least two subscriber identification modules based on a first subscriber identification module in a connected state in the at least two subscriber identification modules.

In one example, the non-connected state includes: an idle state of radio resource control or an inactive state of radio resource control.

Figure 4:
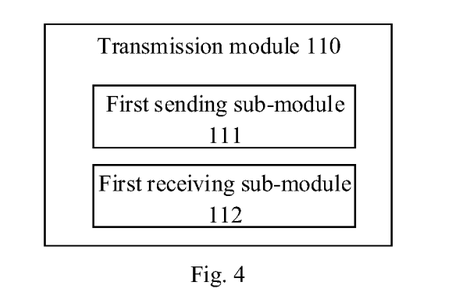
FIG. 4 is a block diagram of another data transmission apparatus illustrated according to an illustrative example.

In one example, as shown in FIG. 4, when the apparatus is applied to the terminal, the transmission module 110 includes one of:

a first sending sub-module 111, configured to send uplink data of the second subscriber identification module to a base station by utilizing the first subscriber identification module; and a first receiving sub-module 112, configured to receive downlink data of the second subscriber identification module sent by the base station by utilizing the first subscriber identification module.

Figure 5:
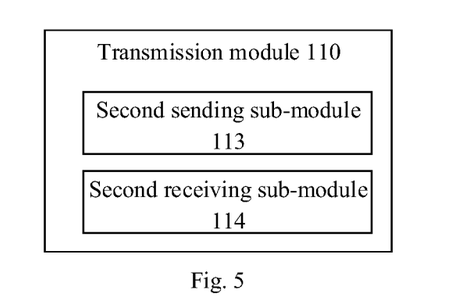
FIG. 5 is a block diagram of yet another data transmission apparatus illustrated according to an illustrative example.

In one example, as shown in FIG. 5, when the apparatus is applied to a base station, the transmission module 110 includes one of:

a second sending sub-module 113, configured to send downlink data of the second subscriber identification module to the first subscriber identification module; and a second receiving sub-module 114, configured to receive uplink data of the second subscriber identification module sent by the first subscriber identification module.

Figure 6:
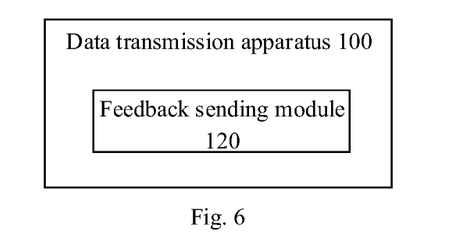
FIG. 6 is a block diagram of further another data transmission apparatus illustrated according to an illustrative example.

In one example, as shown in FIG. 6, the apparatus 100 further includes:

a feedback sending module 120, configured to send reception feedback information of the downlink data to the base station by utilizing the first subscriber identification module after receiving the downlink data of the second subscriber identification module sent by the base station.

Figure 7:
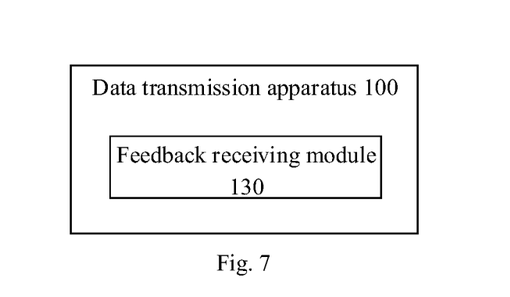
FIG. 7 is a block diagram of further another data transmission apparatus illustrated according to an illustrative example.

In one example, as shown in FIG. 7, the apparatus 100 further includes:

a feedback receiving module 130, configured to receive reception feedback information of the downlink data sent by the first subscriber identification module after sending the downlink data of the second subscriber identification module.

Figure 8:
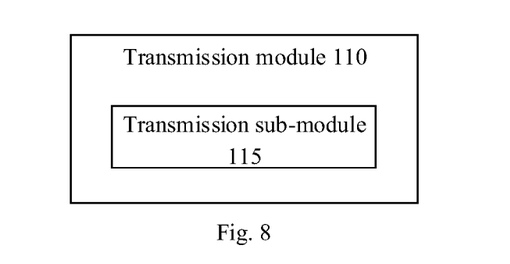
FIG. 8 is a block diagram of further another data transmission apparatus illustrated according to an illustrative example.

In one example, as shown in FIG. 8, the transmission module 110 further includes:

a transmission sub-module 115, configured to transmit the data of the second subscriber identification module and identification information of the second subscriber identification module based on the first subscriber identification module.

Figure 9:
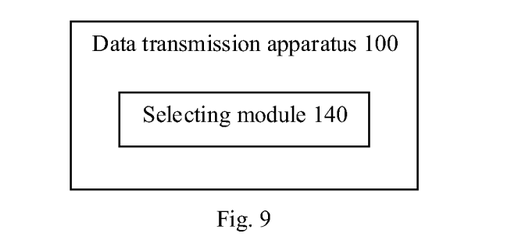
FIG. 9 is a block diagram of further another data transmission apparatus illustrated according to an illustrative example.

In one example, as shown in FIG. 9, the apparatus 100 further includes:

a selecting module 140, configured to, when there is more than one subscriber identification module in the connected state in the at least two subscriber identification modules, select a subscriber identification module with a minimum data cache volume and in the connected state as the first subscriber identification module.

In an illustrative example, the transmission module 110, the feedback sending module 120, the feedback receiving module 130 and the selecting module 140, etc. may be implemented by one or more central processing units (CPU), graphics processing units (GPU), baseband processors (BP), application specific integrated circuits (ASICs), DSPs, programmable logic devices (PLD), complex programmable logic devices (CPLD), field-programmable gate arrays (FPGA), general-purpose processors, controllers, micro controller units (MCU), microprocessors or other electronic elements, and may also be implemented in combination with one or more radio frequency (RF) antennas to be configured to execute the aforementioned method.

Figure 10:
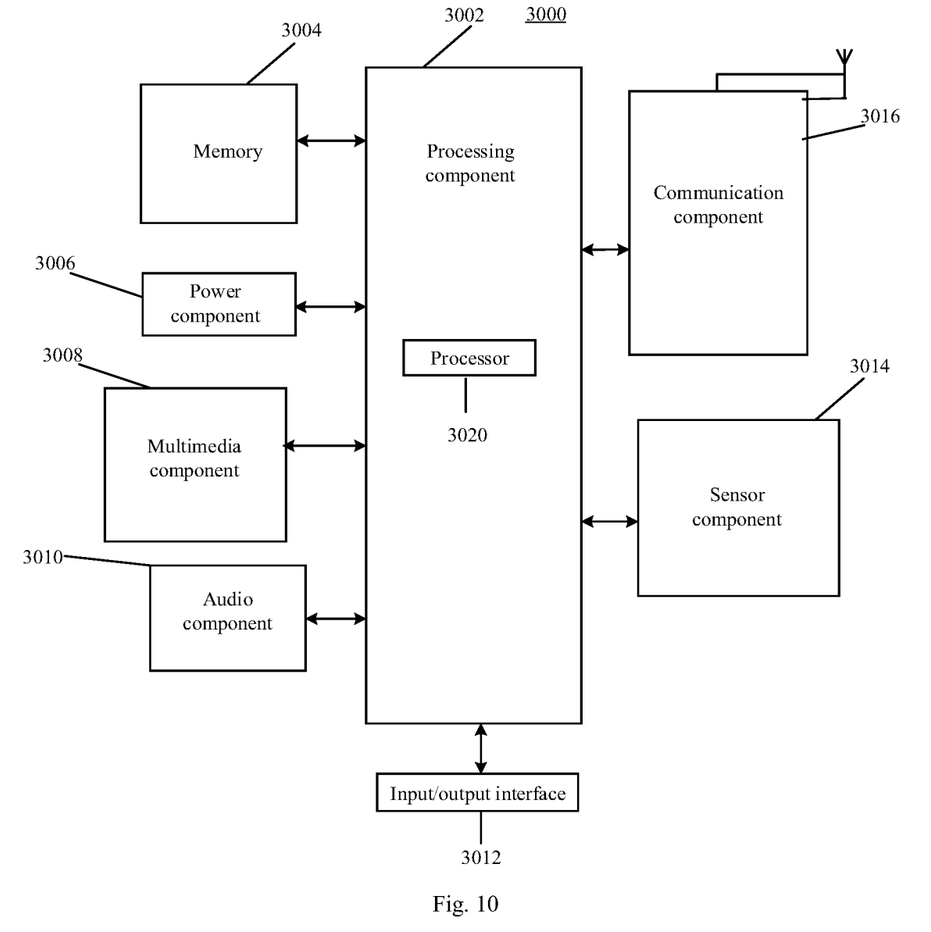
FIG. 10 is a block diagram of an apparatus for data transmission illustrated according to an illustrative example.

FIG. 10 is a block diagram of an apparatus 3000 for HARQ feedback illustrated according to an illustrative example. For example, the apparatus 3000 may be a mobile phone, a computer, a digital broadcasting terminal, a messaging device, a game console, a tablet device, a medical device, a fitness device, a personal digital assistant, etc.

Referring to FIG. 10, the apparatus 3000 may include one or more components of: a processing component 3002, a memory 3004, a power component 3006, a multimedia component 3008, an audio component 3010, an input/output (I/O) interface 3012, a sensor component 3014, and a communication component 3016.

The processing component 3002 typically controls the overall operation of the apparatus 3000, such as operations associated with display, telephone call, data communication, camera operations, and recording operations. The processing component 3002 may include one or more processors 3020 to execute instructions to complete all or part of the steps of the above method. In addition, the processing component 3002 may include one or more modules to facilitate interaction between the processing component 3002 and other components. For example, the processing component 3002 may include a multimedia module to facilitate interaction between the multimedia component 3008 and the processing component 3002.

The memory 3004 is configured to store various types of data to support operations at the apparatus 3000. Examples of these data include instructions for any application or method operating on the apparatus 3000, contact data, phonebook data, messages, pictures, videos, etc. The memory 3004 may be implemented by any type of volatile or nonvolatile storage device or a combination of them, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or optic disk.

The power component 3006 provides power for various components of the apparatus 3000. The power component 3006 may include a power management system, one or more power sources and other components associated with generating, managing and distributing power for the apparatus 3000.

The multimedia component 3008 includes a screen providing an output interface between the apparatus 3000 and a user. In some examples, the screen may include a liquid crystal display (LCD) and a touch panel (TP). If the screen includes the touch panel, the screen may be implemented as a touch screen to receive an input signal from the user. The touch panel includes one or more touch sensors to sense touch, sliding and gestures on the touch panel. The touch sensor can not only sense the boundary of the touch or sliding operation, but also detect the duration and pressure related to the touch or sliding operation. In some examples, the multimedia component 3008 includes a front camera and/or a rear camera. When the apparatus 3000 is in an operation mode, such as a shooting mode or a video mode, the front camera and/or the rear camera can receive external multimedia data. Each front camera and rear camera can be a fixed optical lens system or have a focal length and optical zoom capability.

The audio component 3010 is configured to output and/or input audio signals. For example, the audio component 3010 includes a microphone (MIC) configured to receive an external audio signal when the apparatus 3000 is in the operation mode, such as a call mode, a recording mode, and a speech recognition mode. The received audio signal may be further stored in the memory 3004 or transmitted via the communication component 3016. In some examples, the audio component 3010 also includes a speaker for outputting an audio signal.

The I/O interface 3012 provides an interface between the processing component 3002 and a peripheral interface module which can be a keyboard, a click wheel, a button, etc. These buttons may include but are not limited to: a home button, volume buttons, a start button and a lock button.

The sensor component 3014 includes one or more sensors for providing state evaluation of various aspects of the apparatus 3000. For example, the sensor component 3014 can detect an on/off state of the apparatus 3000 and the relative positioning of the components, for example, the component is a display and a keypad of the apparatus 3000. The sensor component 3014 can also detect a change of the position of the apparatus 3000 or one component of the apparatus 3000, the presence or absence of user contact with the apparatus 3000, the azimuth or acceleration/deceleration of the apparatus 3000, and temperature change of the apparatus 3000. The sensor component 3014 may include a proximity sensor configured to detect the presence of nearby objects without any physical contact. The sensor component 3014 may further include an optical sensor, such as a CMOS or CCD image sensor, for use in imaging applications. In some examples, the sensor component 3014 may further include an acceleration sensor, a gyroscope sensor, a magnetic sensor, a pressure sensor, or a temperature sensor.

The communication component 3016 is configured to facilitate wired or wireless communication between the apparatus 3000 and other devices. The apparatus 3000 may access a wireless network based on a communication standard, such as Wi-Fi, 2G or 3G, or a combination of them. In an illustrative example, the communication component 3016 receives a broadcast signal or broadcast-related information from an external broadcast management system via a broadcast channel. In an illustrative example, the communication component 3016 further includes a near field communication (NFC) module to facilitate short-range communication. For example, the NFC module may be implemented based on radio frequency identification (RFID) technology, infrared data association (IrDA) technology, ultra wideband (UWB) technology, Bluetooth (BT) technology and other technologies.

In an illustrative example, the apparatus 3000 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic elements for performing the above method.

In an illustrative example, a non-transitory computer-readable storage medium such as the memory 3004, including instructions, which can be executed by the processor 3020 of the apparatus 3000 to complete the above method, is also provided. For example, the non-transitory computer-readable storage medium may be a ROM, a random access memory (RAM), a CD-ROM, a magnetic tape, a floppy disk, an optical data storage device, etc.

According to the data transmission method and apparatus, the communication device and the storage medium provided by the examples of the disclosure, when the terminal includes the at least two subscriber identification modules, the data of the second subscriber identification module in the non-connected state in the at least two subscriber identification modules are transmitted based on the first subscriber identification module in the connected state in the at least two subscriber identification modules. The first subscriber identification module in the connected state is adopted to transmit the data of the second subscriber identification module in the non-connected state, the second subscriber identification module can achieve data transmission without the need of establishing a connected state, and on the one hand, time consumed by establishing the connected state for the second subscriber identification module can be saved, and the data transmission efficiency is improved. On the other hand, electrical power consumed by establishing the connected state for the second subscriber identification module can be saved, and standby time of the terminal is prolonged.

Other implementations of the examples of the disclosure will be apparent to those skilled in the art from consideration of the specification and practice of the disclosure herein. The present application is intended to cover any variations, uses, or adaptations of the examples of the disclosure following the general principles of the disclosure and including such departures from the disclosure as come within known or customary practice in the art.

It will be appreciated that the examples of the disclosure are not limited to the exact construction that has been described above and illustrated in the accompanying drawings, and that various modifications and changes may be made without departing from the scope of the disclosure.

What is claimed is:

1. A data transmission method for use when a terminal comprises at least two subscriber identification modules, the method comprising:

when there is more than one subscriber identification module in a connected state in the at least two subscriber identification modules, selecting a subscriber identification module with a minimum data cache volume and in the connected state as a first subscriber identification module;

transmitting data of a second subscriber identification module in a non-connected state in the at least two subscriber identification modules based on the first subscriber identification module in the connected state in the at least two subscriber identification modules.

2. The data transmission method according to claim 1, wherein the non-connected state comprises:
an idle state of radio resource control; or
an inactive state of radio resource control.

3. The data transmission method according to claim 1, wherein
when the data transmission method is applied to the terminal, transmitting the data of the second subscriber identification module in the non-connected state in the at least two subscriber identification modules based on the first subscriber identification module in the connected state in the at least two subscriber identification modules, comprises one of:
sending, by the terminal, uplink data of the second subscriber identification module to a base station by utilizing the first subscriber identification module; or
receiving, by the terminal, downlink data of the second subscriber identification module sent by the base station by utilizing the first subscriber identification module.

4. The data transmission method according to claim 1, wherein
when the data transmission method is applied to a base station, transmitting the data of the second subscriber identification module in the non-connected state in the at least two subscriber identification modules based on the first subscriber identification module in the connected state in the at least two subscriber identification modules, comprises one of:
sending, by the base station, downlink data of the second subscriber identification module to the first subscriber identification module; or
receiving, by the base station, uplink data of the second subscriber identification module sent by the first subscriber identification module.

5. The data transmission method according to claim 3, wherein the data transmission method further comprises:
sending, by the terminal, reception feedback information of the downlink data to the base station by utilizing the first subscriber identification module.

6. The data transmission method according to claim 4, wherein the data transmission method further comprises:
receiving, by the base station, reception feedback information of the downlink data sent by the first subscriber identification module.

7. The data transmission method according to claim 1, wherein, transmitting the data of the second subscriber identification module in the non-connected state in the at least two subscriber identification modules based on the first subscriber identification module in the connected state in the at least two subscriber identification modules, comprises:
transmitting the data of the second subscriber identification module and identification information of the second subscriber identification module based on the first subscriber identification module.

8. A communication device, comprising a processor, a transceiver, a memory and an executable program stored on the memory and capable of being executed by the processor, wherein the executable program, when executed by the processor, executes:
when a terminal comprises at least two subscriber identification modules, and there is more than one subscriber identification module in a connected state in the at least two subscriber identification modules, selecting a subscriber identification module with a minimum data cache volume and in the connected state as a first subscriber identification module;
transmitting data of a second subscriber identification module in a non-connected state in the at least two subscriber identification modules based on the first subscriber identification module in the connected state in the at least two subscriber identification modules.

9. A non-transitory storage medium, storing an executable program thereon, wherein the executable program, when executed by a processor, implements:
when a terminal comprises at least two subscriber identification modules, and there is more than one subscriber identification module in a connected state in the at least two subscriber identification modules, selecting a subscriber identification module with a minimum data cache volume and in the connected state as a first subscriber identification module;
transmitting data of a second subscriber identification module in a non-connected state in the at least two subscriber identification modules based on the first subscriber identification module in the connected state in the at least two subscriber identification modules.

10. The communication device according to claim 8, wherein the non-connected state comprises:
an idle state of radio resource control; or
an inactive state of radio resource control.

11. The communication device according to claim 8, wherein the communication device is the terminal, and the executable program, when executed by the processor, further executes:
sending, by the terminal, uplink data of the second subscriber identification module to a base station by utilizing the first subscriber identification module; or
receiving, by the terminal, downlink data of the second subscriber identification module sent by the base station by utilizing the first subscriber identification module.

12. The communication device according to claim 8, wherein the communication device is a base station, and the executable program, when executed by the processor, further executes:
sending, by the base station, downlink data of the second subscriber identification module to the first subscriber identification module; or
receiving, by the base station, uplink data of the second subscriber identification module sent by the first subscriber identification module.

13. The communication device according to claim 11, wherein the executable program, when executed by the processor, further executes:
sending, by the terminal, reception feedback information of the downlink data to the base station by utilizing the first subscriber identification module.

14. The communication device according to claim 12, wherein the executable program, when executed by the processor, further executes:
receiving, by the base station, reception feedback information of the downlink data sent by the first subscriber identification module.

15. The communication device according to claim 8, wherein, the executable program, when executed by the processor, further executes:
transmitting the data of the second subscriber identification module and identification information of the second subscriber identification module based on the first subscriber identification module.

16. The non-transitory storage medium according to claim 9, wherein the non-connected state comprises:
- an idle state of radio resource control; or
- an inactive state of radio resource control.

17. The non-transitory storage medium according to claim 9, wherein the executable program, when executed by the processor, further implements:
- sending, by the terminal, uplink data of the second subscriber identification module to a base station by utilizing the first subscriber identification module; or
- receiving, by the terminal, downlink data of the second subscriber identification module sent by the base station by utilizing the first subscriber identification module.

18. The non-transitory storage medium according to claim 9, wherein the executable program, when executed by the processor, further implements:
- sending, by a base station, downlink data of the second subscriber identification module to the first subscriber identification module; or
- receiving, by the base station, uplink data of the second subscriber identification module sent by the first subscriber identification module.

\* \* \* \* \*